United States Patent
Xie et al.

(10) Patent No.: US 12,419,229 B2
(45) Date of Patent: Sep. 23, 2025

(54) ARRAY CUTTING KNIFE-TYPE COTTON TOPPING MACHINE AND CONTROL METHOD THEREOF

(71) Applicant: Nanjing Institute of Agricultural Mechanization, Ministry of Agriculture and Rural Affairs, Jiangsu (CN)

(72) Inventors: Qing Xie, Jiangsu (CN); Teng Wu, Jiangsu (CN); Fanting Kong, Jiangsu (CN); Bin Zhang, Jiangsu (CN); Yongfei Sun, Jiangsu (CN); Changlin Chen, Jiangsu (CN)

(73) Assignee: Nanjing Institute of Agricultural Mechanization, Ministry of Agriculture and Rural Affairs, Nanjing (CN)

( * ) Notice: Subject to any disclaimer, the term of this patent is extended or adjusted under 35 U.S.C. 154(b) by 0 days.

(21) Appl. No.: 18/626,073

(22) Filed: Apr. 3, 2024

(65) Prior Publication Data
US 2025/0120350 A1   Apr. 17, 2025

Related U.S. Application Data

(63) Continuation of application No. PCT/CN2024/070447, filed on Jan. 3, 2024.

(30) Foreign Application Priority Data

Oct. 12, 2023 (CN) .......................... 202311322751.0

(51) Int. Cl.
A01D 23/02 (2006.01)
A01D 46/08 (2006.01)
A01G 22/50 (2018.01)

(52) U.S. Cl.
CPC ........ *A01G 22/50* (2018.02); *A01D 2023/026* (2013.01); *A01D 46/08* (2013.01)

(58) Field of Classification Search
CPC ...... A01D 46/253; A01D 23/00; A01D 27/04; A01D 34/286; A01D 2023/026;
(Continued)

(56) References Cited

U.S. PATENT DOCUMENTS 2,977,741 A * 4/1961 Stroman ................ A01D 46/08
56/13.6
3,017,732 A * 1/1962 Keyes .................... A01D 47/00
37/189
(Continued)

FOREIGN PATENT DOCUMENTS

| CN | 110547114 A | 12/2019 |
| CN | 110915469 A | 3/2020 |
| CN | 113273395 A | 8/2021 |

*Primary Examiner* — Adam J Eiseman
*Assistant Examiner* — Samuel A Davies

(57) ABSTRACT

Disclosed are an array cutting knife-type cotton topping machine and a control method thereof. The cotton topping machine includes cameras, controllers, a tacho-generator and a plurality of groups of topping assemblies arranged in a left-right direction; the cameras and the tacho-generator are connected to the controllers; and a plurality of topping devices staggered left and right are arranged for each planting row. In the present disclosure, by densely arranging low-cost topping devices and determining which topping devices are switched to an operating state for topping according to visually determined top bud positions, the potential problems in the prior art of the damage to other parts of the plant or the unnecessary intertwining of branches and leaves are avoided.

10 Claims, 4 Drawing Sheets

(58) Field of Classification Search
CPC .............. A01D 2023/028; A01D 46/08; A01D 46/081; A01D 46/085; A01G 3/00; A01G 3/08; A01G 2003/0443; A01G 22/50
USPC ................................................ 56/28, 40, 46
See application file for complete search history.

(56) References Cited

U.S. PATENT DOCUMENTS

| | | | | |
|---|---|---|---|---|
| 3,683,603 | A * | 8/1972 | Smith | A01D 45/16 56/63 |
| 4,603,543 | A * | 8/1986 | Cornell | A01D 46/085 56/28 |
| 4,722,173 | A * | 2/1988 | Covington | A01D 67/00 56/28 |
| 4,922,695 | A * | 5/1990 | Covington | A01D 46/081 56/40 |
| 5,081,828 | A * | 1/1992 | Covington | A01D 46/081 56/28 |
| 5,201,350 | A * | 4/1993 | Milbourn | A01G 23/091 144/34.1 |
| 5,809,440 | A * | 9/1998 | Beck | A01M 7/0089 711/E12.089 |
| 5,810,093 | A * | 9/1998 | Howard | A01B 1/065 172/111 |
| 8,381,502 | B2 * | 2/2013 | Dunn | A01D 47/00 56/15.8 |
| 10,602,665 | B2 * | 3/2020 | Briquet-Kerestedjian | A01B 63/008 |
| 11,925,138 | B2 * | 3/2024 | Florence | A01D 33/14 |
| 2011/0047951 | A1 * | 3/2011 | Moore | A01D 46/24 56/328.1 |
| 2014/0180549 | A1 * | 6/2014 | Siemens | A01B 39/18 701/50 |
| 2018/0084725 | A1 * | 3/2018 | Ostermeier | A01D 46/14 |
| 2020/0281122 | A1 * | 9/2020 | Mor | A01F 15/00 |
| 2024/0269875 | A1 * | 8/2024 | Jasiewicz | A01G 3/00 |

* cited by examiner

ARRAY CUTTING KNIFE-TYPE COTTON TOPPING MACHINE AND CONTROL METHOD THEREOF

CROSS-REFERENCE TO RELATED APPLICATIONS

This application is a continuation of PCT/CN2024/070447, filed Jan. 3, 2024 and claims priority of Chinese Patent Application No. 202311322751. 0, filed on Oct. 12, 2023, the entire contents of which are incorporated herein by reference.

TECHNICAL FIELD

The present disclosure relates to the technical field of agricultural machinery, in particular to an array cutting knife-type cotton topping machine and a control method thereof.

BACKGROUND

In the process of planting cotton crops, it is necessary to perform a topping operation on the top of a plant. In the prior art, in order to ensure the success rate of topping, it is necessary to densely arrange topping devices within the operation width of a topping machine in the prior art. For example, a topping device and agricultural equipment is disclosed in Patent CN212367966U, including a mounting base and a plurality of actuators. The mounting base includes a first mounting portion extending in a horizontal direction. The plurality of actuators are arranged at intervals in the horizontal direction on the first mounting portion, and the spacing between any two adjacent actuators is greater than zero and less than a width of one actuator. Each actuator includes an executive driving assembly and a topping assembly mounted on the executive driving assembly. Each executive driving assembly is configured to reciprocate in a vertical plane to drive the topping assembly to perform the topping operation in the vertical plane. In the above-mentioned solution, the success rate of topping can be effectively improved by arranging actuators densely. However, since all the actuators are operated at the same time, it is easy to accidentally damage other parts of the crop and lead to the problems of twining branches and leaves with the actuators, resulting in poor topping effect.

In addition, a typical vision-based topping device is disclosed in the patent CN212064976U, which performs top bud recognition by a top bud image recognition device, and a multi-axis mechanical arm is controlled to perform topping on the recognized top buds. In the solution, although the precision topping can be achieved, the cost of the multi-axis mechanical arm is high, the scheduling control is complicated, and a control system required for control also is relatively in high cost. When the top buds are relatively dense, the response speed of the multi-axis mechanical arm may be slow.

SUMMARY

An object of the present disclosure is to provide a low-cost array cutting knife-type cotton topping machine capable of precise topping and a control method thereof, to overcome the deficiencies of the prior art.

In order to achieve the above-mentioned object, the technical solution of the present disclosure is to provide an array cutting knife-type cotton topping machine, including cameras, controllers, a tacho-generator and a plurality of groups of topping assemblies arranged in a left-right direction. The cameras and the tacho-generator are connected to the controllers; and the topping assembly includes lifting mechanisms and lifting seats, topping devices are mounted on the lifting seat, and the topping device has a topping actuator.

A plurality of topping devices staggered left and right are arranged for each planting row; and each of the topping devices is independently switchable between an operating state and a non-operating state, and the switching of states is controlled by the controller.

Further, the topping device includes a fixing seat fixed relative to the lifting seat, and further includes a swing rod rotatably mounted relative to the fixing seat and a driving mechanism for driving the swing rod to swing in a reciprocating pattern; and the topping actuator is fixed to an end portion of the swing rod.

Further, the driving mechanism is an electromagnet, an electric push rod, an air cylinder, or an oil cylinder.

Further, the same topping device is arranged in a multi-row linear array, and the topping devices belonging to different rows are mutually staggered in the left-right direction.

Further, the topping actuator includes a cutting knife, a driving motor and a protective cover; and the protective cover has a conical shape and covers an outer side of the cutting knife, and the protective cover has notch parts on left and right sides.

Further, the cotton topping machine includes main supports, and a plurality of groups of topping split assemblies are mounted on the main supports. Each group of the topping split assemblies includes split supports, two groups of the topping assemblies and one of the cameras centrally mounted relative to the two groups of the topping assemblies and protruding forwards are mounted on the split supports; and each group of the topping split assemblies has the controller.

Further, the topping assembly includes mounting plates fixed to the split support, guide sleeves mounted on the mounting plate, and guide rods fixed on the lifting seat slidingly fitted with the guide sleeves.

A control method for an array cutting knife-type cotton topping machine applied to a cotton topping machine described above and implemented by controllers includes:
  acquiring images collected by cameras;
  identifying and obtaining top bud positions of each row of cotton crops according to the images, the top bud positions including top bud heights and top bud longitudinal positions;
  controlling the operation of lifting mechanisms to cause heights of topping devices to be adapted to heights of the nearest top buds to be topped;
  determining an optimal cutting position of top buds according to the top bud longitudinal positions, and selecting the topping device according to the optimal cutting position; and
  controlling the selected topping device to switch to an operating state to perform topping, and resetting the topping device after the topping is completed.

Beneficial effects are as follows. According to an array cutting knife-type cotton topping machine and a control method thereof of the present disclosure, by densely arranging low-cost topping devices and determining which topping devices are switched to an operating state for topping according to visually determined top bud positions, the precision topping can be realized, and the potential problems in the prior art of the damage to other parts of the plant or the unnecessary intertwining of branches and leaves are avoided. The present disclosure is simple in control and low in structural cost and control cost.

Figure 1:
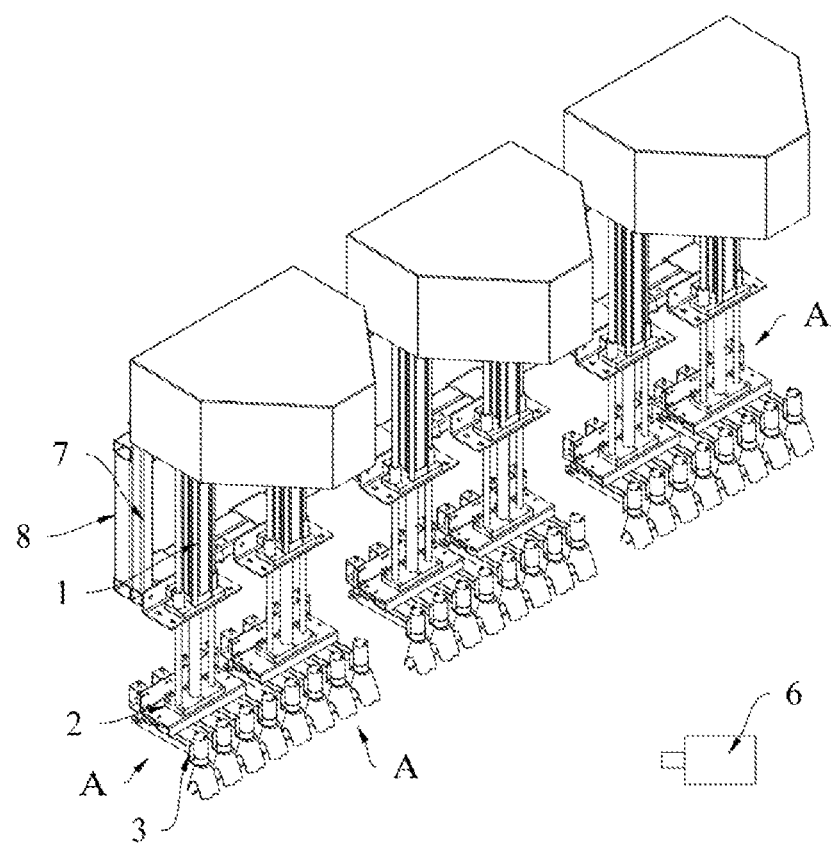
FIG. 1 is a structural diagram from a first perspective of an array cutting knife-type cotton topping machine.

Reference numerals and denotations thereof: A-topping assembly; 1—lifting mechanism; 2—lifting seat; 3—topping device; 31—topping actuator; 3a—cutting knife; 3b—driving motor; 3c—protective cover; 32—fixing seat; 33—swing rod; 34—driving mechanism; 4—camera; 5—controller; 6—tacho-generator; 7—split support; 71—U-shaped bolt; 8—main support; 81—hitch part; 91—mounting plate; 92—guide sleeve; and 93—guide rod.

DETAILED DESCRIPTION

Hereinafter, the present disclosure will be further described with reference to the attached drawings.

Figure 2:
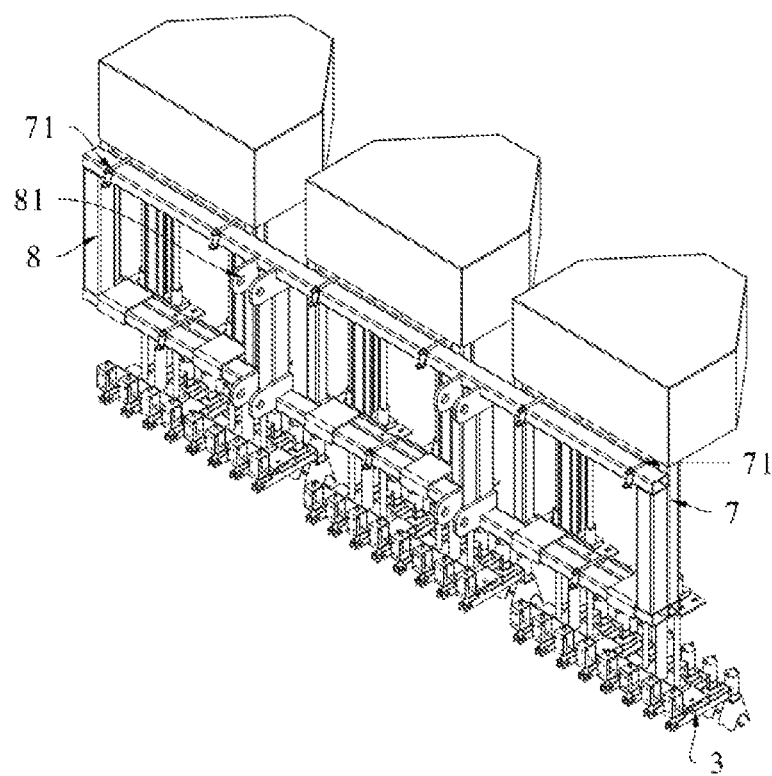
FIG. 2 is a structural diagram from a second perspective of the array cutting knife-type cotton topping machine.
Figure 3:
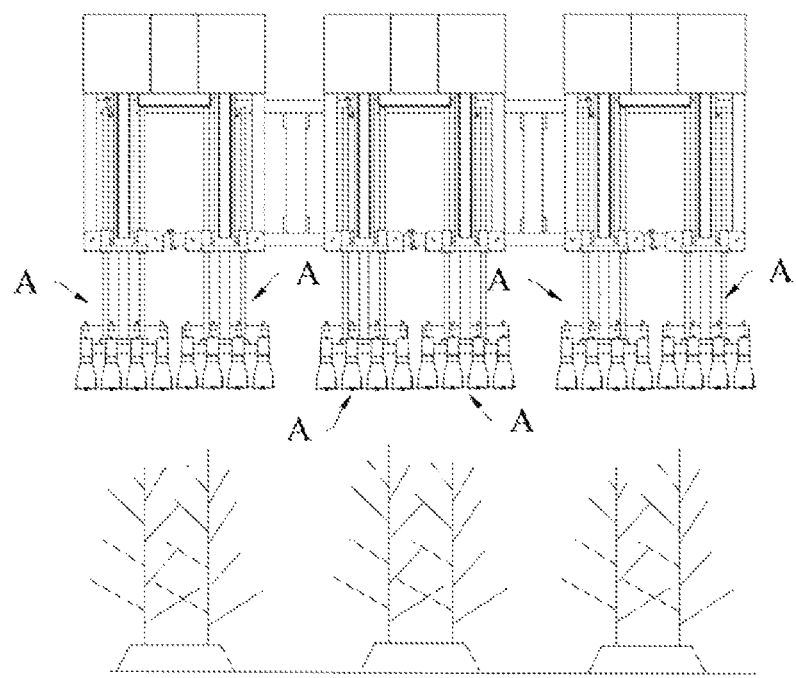
FIG. 3 shows the corresponding relationship between the array cutting knife-type cotton topping machine and plants.
Figure 4:
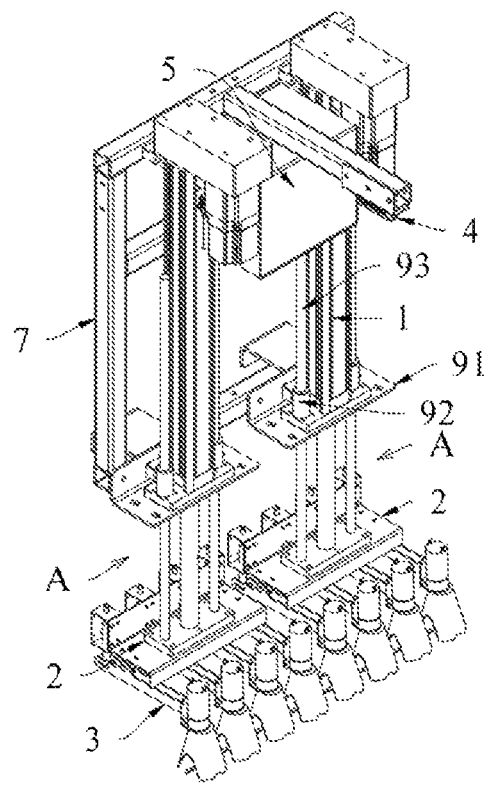
FIG. 4 is a structural diagram of a topping split assembly.

As shown in FIGS. 1-3, an array cutting knife-type cotton topping machine includes main supports 8, and a plurality of groups of topping split assemblies are mounted on the main supports 8. As shown in FIG. 4, each group of the topping split assemblies includes split supports 7, two groups of the topping assemblies A and one of the cameras 4 centrally mounted relative to the two groups of the topping assemblies A and protruding forwards are mounted on the split supports 7, the cameras 4 being capable of acquiring images of two rows of plants; and each group of the topping split assemblies has the controller 5. All the topping assemblies A are arranged in a left-right direction.

In the actual topping operation, each topping split assembly operates independently, and the split supports 7 are connected to the main supports 8 via U-shaped bolts 71. As shown in FIG. 3, the above-mentioned structure satisfies the planting characteristics of cotton at intervals of two rows, and the left and right positions of the split support can be adjusted by loosening the U-shaped bolts 71 to accommodate cotton crops with different planting intervals. The main supports 8 have hitch parts 81, and a traction machine, such as a tractor or a high-clearance pesticide spraying machine, can be connected to the hitch parts 81.

The cotton topping machine further includes a tacho-generator 6 for measuring a forward velocity of the machine, and the tacho-generator 6 may be in the form of a GPS module, a Hall sensor for detecting a revolving speed of wheels in the traction machine, an encoder, etc.

Each group of topping assemblies A corresponds to one planting row, the camera 4 acquires an image of the planting row, and the camera 4 and the tacho-generator 6 are connected to the controller 5; the topping assembly A includes lifting mechanisms 1 and lifting seats 2, and the lifting mechanism 1 in the example is an oil cylinder; and topping devices 3 are mounted on the lifting seat 2, and the topping device 3 has a topping actuator 31. The topping assembly A includes mounting plates 91 fixed to the split support 7, guide sleeves 92 mounted on the mounting plate 91, and guide rods 93 fixed on the lifting seat 2 slidingly fitted with the guide sleeves 92. In this way, it is possible to keep the lifting seat 2 lifting smoothly.

Figure 6:
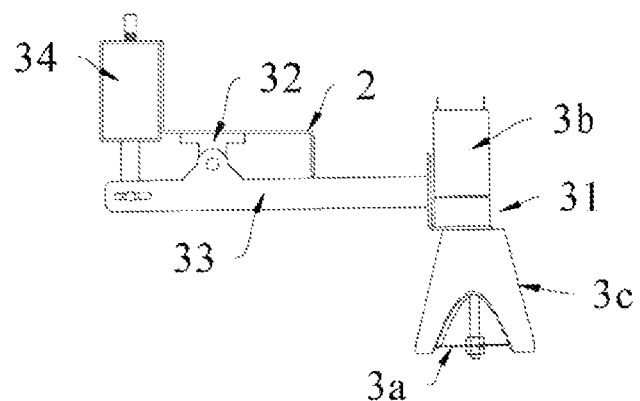
FIG. 6 is a first state diagram of the topping device.
Figure 7:
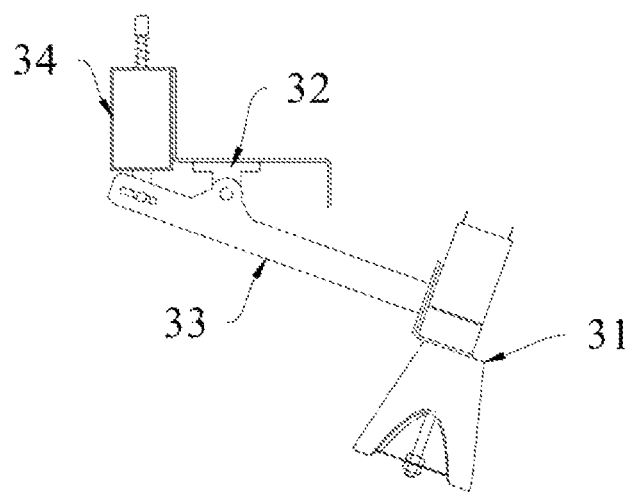
FIG. 7 is a second state diagram of the topping device.

A plurality of topping devices 3 staggered left and right are arranged for each planting row; and each of the topping devices 3 is independently switchable between an operating state (as shown in FIG. 7) and a non-operating state (as shown in FIG. 6), and the switching of states is controlled by the controller 5. During operation, the controller 5 identifies the top positions of the plants to be topped in each planting row based on the image collected by the camera 4, and controls the corresponding topping device 3 to switch to an operating state; only no more than a pre-set number of topping devices 3 in each of the topping assemblies A are in an operating state, and the pre-set number may be 1, 2 and 3, or may be a larger number according to actual needs.

The topping device 3 includes a fixing seat 32 fixed relative to the lifting seat 2, and further includes a swing rod 33 rotatably mounted relative to the fixing seat 32 and a driving mechanism 34 for driving the swing rod 33 to swing in a reciprocating pattern; and the topping actuator 31 is fixed to an end portion of the swing rod 33. With this structure, by controlling the movement of the swing rod 33, the topping actuator 31 can be switched between an operating state and a non-operating state, and the position of the topping actuator 31 of the topping device 3 in the operating state is lower than that of the topping actuators 31 of other topping devices 3, so that the topping actuator 31 of the topping device 3 in the non-operating state does not interfere with the topping operation and cause damage to plants.

The driving mechanism 34 is an electromagnet, an electric push rod, an air cylinder, or an oil cylinder. Preferably, the driving mechanism 34 is an electromagnet having a rapid response feature, and a telescopic part of the electromagnet can be rapidly extended and retracted, and is suitable for high-frequency state switching of the topping actuator 31.

Figure 5:
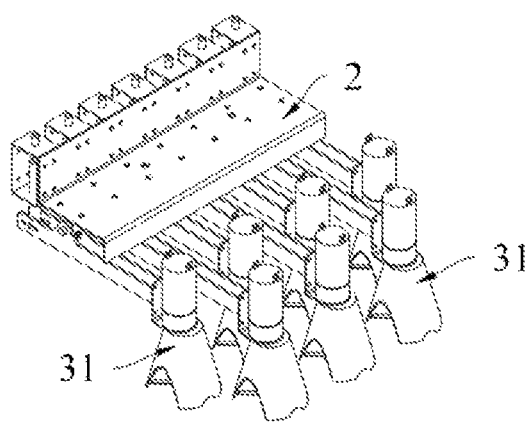
FIG. 5 is a layout diagram of the topping device.

All of the topping actuators 31 in the same topping device 3 can be arranged in a single-row linear array as shown in FIG. 3. Preferably, as shown in FIG. 5, the same topping device 3 is arranged in a multi-row linear array, and the topping devices 3 belonging to different rows are mutually staggered in the left-right direction, and the operation range of the topping devices 3 of different rows has an overlapping area in the left-right direction, so that the arrangement density of the topping devices 3 in the left-right direction can be effectively improved, and compared with a single row arrangement, a cutting blind area between adjacent topping devices 3 can be effectively eliminated, and the success rate of the topping operation can be ensured.

The topping actuator 31 includes a cutting knife 3a, a driving motor 3b and a protective cover 3c; and the protective cover 3c has a conical shape and covers an outer side of the cutting knife 3a, and the protective cover 3c has notch parts on left and right sides to cause left and right widths of the protective cover 3c to be smaller than a maximum outer diameter of the protective cover 3c. The protective cover 3c can protect the cutting knife 3a from the branches and leaves nearby from winding on a shaft of the cutting knife 3a. When the topping actuator 31 is in a non-operating state, a lower port of the protective cover 3c is flat; when the topping actuator 31 is in an operating state, the swing rod 33 rotates so that the topping actuator 31 also deflects; lower ports of the protective cover 3c and the cutting knife 3a tilt backwards (high in the back and low in the front), so that the cutting knife 3a can perform the topping operation, and the protective cover 3c can block the branches and leaves of crops in front so as not to be wound on the knife shaft. The notch parts are arranged on two sides of the protective cover 3c to cause the protective covers 3c to be arranged more densely, effectively reducing the spacing between adjacent cutting knifes 3a, and further reducing the cutting blind area.

The present disclosure also provides a control method for an array cutting knife-type cotton topping machine applied to the above-mentioned cotton topping machine and implemented by the controller 5, the method including the following steps. At step S1, images collected by cameras 4 were acquired.

At step S2, top bud positions of each row of cotton crops were identified and obtained according to the images, the top bud positions including top bud heights and top bud longitudinal positions.

At step S3, the operation of lifting mechanisms 1 was controlled to cause heights of topping devices 3 to be adapted to heights of the nearest top buds to be topped.

At step S4, an optimal cutting position of top buds was determined according to the top bud longitudinal positions, and the topping device 3 was selected according to the optimal cutting position.

At step S5, the selected topping device 3 was controlled to switch to an operating state to perform topping, and the topping device 3 was reset after the topping was completed.

With the above-mentioned structure, the topping device 3 can be selected to perform the topping operation according to the position of each of top buds in the planting row based on vision, to achieve the precision topping, and the topping actuator 31 is quickly reset after topping is completed. When the topping device 3 is actually selected. If a deviation distance between a center line of an operation range of the topping device 3 closest to the optimal cutting position and the optimal cutting position is within a pre-set range, the topping device 3 closest to the optimal cutting position can be selected and switched to the operating state; and if the deviation distance between the center line of the operation range of the topping device 3 closest to the optimal cutting position and the optimal cutting position is outside the pre-set range, two topping devices 3 on two sides of the optimal cutting position can be selected to switch to the operating state at the same time to ensure successful topping. In addition, if the weather conditions are relatively poor and the top buds swing back and forth, the controller 5 can obtain a transverse swing position interval of the top buds according to the collected image, a plurality of topping devices 3 capable of switching to the operating state are selected based on the swing position interval, and a total width of an operation range of the selected topping devices 3 is greater than an interval width of the transverse swing position interval.

The above is only the preferred example of the present disclosure, and it is to be pointed out that those skilled in the art can make several improvements and embellishments without departing from the principle of the present disclosure, and these improvements and embellishments are also to be regarded as the protection scope of the present disclosure.

The invention claimed is:

1. An array cutting knife-type cotton topping machine, comprising cameras (4), controllers (5), a tacho-generator (6) and a plurality of groups of topping assemblies (A) arranged in a left-right direction, the cameras (4) and the tacho-generator (6) being connected to the controllers (5), and each group of the topping assemblies (A) comprising a lifting mechanism (1) and a lifting seat (2), a plurality of topping devices (3) being mounted on the lifting seat (2), and each of the topping devices (3) having a topping execution mechanism (31), wherein:
the plurality of topping devices (3) staggered left and right are arranged for each planting row; and each of the topping devices (3) is independently switchable between an operating state and a non-operating state, and the switching of states is controlled by the controller (5), the controller (5) being capable of identifying top positions of plants to be topped in each planting row based on an image collected by the camera (4) during operation and controlling a corresponding topping device (3) to switch to an operating state, and a position of the topping execution mechanism (31) of the topping device (3) in the operating state being lower than that of the topping execution mechanisms (31) of other topping devices (3);
the topping device (3) comprises a fixing seat (32) fixed relative to the lifting seat (2), and further comprises a swing rod (33) rotatably mounted relative to the fixing seat (32) and a driving mechanism (34) for driving the swing rod (33) to swing in a reciprocating pattern; and the topping execution mechanism (31) is fixed to an end portion of the swing rod (33); and
the topping execution mechanism (31) comprises a cutting knife (3a), a driving motor (3b) and a protective cover (3c); and the protective cover (3c) has a conical shape and covers an outer side of the cutting knife (3a), and the protective cover (3c) has notch parts on left and right sides.

2. The array cutting knife-type cotton topping machine according to claim 1, wherein the driving mechanism (34) is an electromagnet, an electric push rod, an air cylinder, or an oil cylinder.

3. The array cutting knife-type cotton topping machine according to claim 1, wherein the topping devices (3) are arranged in a multi-row linear array, and the topping devices (3) belonging to different rows are mutually staggered in the left-right direction.

4. The array cutting knife-type cotton topping machine according to claim 1, wherein the cotton topping machine comprises main supports (8), and a plurality of groups of topping split assemblies are mounted on the main supports (8); each group of the topping split assemblies comprises split supports (7), two groups of the topping assemblies (A) and one of the cameras (4) centrally mounted relative to the two groups of the topping assemblies (A) and protruding forwards are mounted on the split supports (7); and each group of the topping split assemblies has the controller (5).

5. The array cutting knife-type cotton topping machine according to claim 4, wherein the topping assembly (A) comprises mounting plates (91) fixed to the split support (7), guide sleeves (92) mounted on the mounting plate (91), and guide rods (93) fixed on the lifting seat (2) slidingly fitted with the guide sleeves (92).

6. A control method for an array cutting knife-type cotton topping machine applied to a cotton topping machine according to claim 1 and implemented by controllers (5), comprising:
acquiring images collected by cameras (4);
identifying and obtaining top bud positions of each row of cotton crops according to the images, the top bud positions comprising top bud heights and top bud longitudinal positions;
controlling the operation of lifting mechanisms (1) to cause heights of topping devices (3) to be adapted to heights of the nearest top buds to be topped;

determining an optimal cutting position of top buds according to the top bud longitudinal positions, and selecting the topping device (3) according to the optimal cutting position; and controlling the selected topping device (3) to switch to an operating state to perform topping, and resetting the topping device (3) after the topping is completed.

7. A control method for an array cutting knife-type cotton topping machine applied to a cotton topping machine according to claim 4 and implemented by controllers (5), comprising:

acquiring images collected by cameras (4);

identifying and obtaining top bud positions of each row of cotton crops according to the images, the top bud positions comprising top bud heights and top bud longitudinal positions;

controlling the operation of lifting mechanisms (1) to cause heights of topping devices (3) to be adapted to heights of the nearest top buds to be topped;

determining an optimal cutting position of top buds according to the top bud longitudinal positions, and selecting the topping device (3) according to the optimal cutting position; and controlling the selected topping device (3) to switch to an operating state to perform topping, and resetting the topping device (3) after the topping is completed.

8. A control method for an array cutting knife-type cotton topping machine applied to a cotton topping machine according to claim 2 and implemented by controllers (5), comprising:

acquiring images collected by cameras (4);

identifying and obtaining top bud positions of each row of cotton crops according to the images, the top bud positions comprising top bud heights and top bud longitudinal positions;

controlling the operation of lifting mechanisms (1) to cause heights of topping devices (3) to be adapted to heights of the nearest top buds to be topped;

determining an optimal cutting position of top buds according to the top bud longitudinal positions, and selecting the topping device (3) according to the optimal cutting position; and controlling the selected topping device (3) to switch to an operating state to perform topping, and resetting the topping device (3) after the topping is completed.

9. A control method for an array cutting knife-type cotton topping machine applied to a cotton topping machine according to claim 3 and implemented by controllers (5), comprising:

acquiring images collected by cameras (4);

identifying and obtaining top bud positions of each row of cotton crops according to the images, the top bud positions comprising top bud heights and top bud longitudinal positions;

controlling the operation of lifting mechanisms (1) to cause heights of topping devices (3) to be adapted to heights of the nearest top buds to be topped;

determining an optimal cutting position of top buds according to the top bud longitudinal positions, and selecting the topping device (3) according to the optimal cutting position; and controlling the selected topping device (3) to switch to an operating state to perform topping, and resetting the topping device (3) after the topping is completed.

10. A control method for an array cutting knife-type cotton topping machine applied to a cotton topping machine according to claim 5 and implemented by controllers (5), comprising:

acquiring images collected by cameras (4);

identifying and obtaining top bud positions of each row of cotton crops according to the images, the top bud positions comprising top bud heights and top bud longitudinal positions;

controlling the operation of lifting mechanisms (1) to cause heights of topping devices (3) to be adapted to heights of the nearest top buds to be topped;

determining an optimal cutting position of top buds according to the top bud longitudinal positions, and selecting the topping device (3) according to the optimal cutting position; and controlling the selected topping device (3) to switch to an operating state to perform topping, and resetting the topping device (3) after the topping is completed.

\* \* \* \* \*